No. 790,157. PATENTED MAY 16, 1905.
W. & H. ROSE.
MACHINE FOR MAKING COLLAPSIBLE BOXES.
APPLICATION FILED NOV. 8, 1902.

14 SHEETS—SHEET 1.

No. 790,157. PATENTED MAY 16, 1905.
W. & H. ROSE.
MACHINE FOR MAKING COLLAPSIBLE BOXES.
APPLICATION FILED NOV. 8, 1902.

14 SHEETS—SHEET 3.

WITNESSES
F. W. Wright
E. W. Collins

INVENTORS
William Rose
Henry Rose
BY
Horton and Horton
ATTORNEYS

No. 790,157. PATENTED MAY 16, 1905.
W. & H. ROSE.
MACHINE FOR MAKING COLLAPSIBLE BOXES.
APPLICATION FILED NOV. 8, 1902.
14 SHEETS—SHEET 5.

WITNESSES
F. W. Wright.
E. W. Collins.

INVENTORS
William Rose, Henry Rose
BY
Howson and Howson
ATTORNEYS

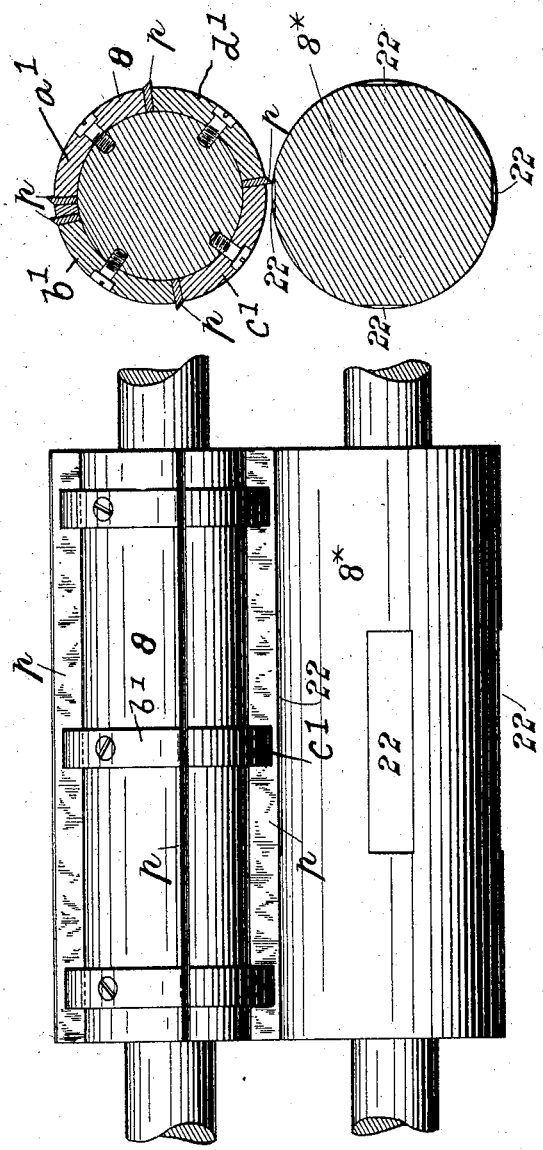

No. 790,157. PATENTED MAY 16, 1905.
W. & H. ROSE.
MACHINE FOR MAKING COLLAPSIBLE BOXES.
APPLICATION FILED NOV. 8, 1902.

14 SHEETS—SHEET 7.

WITNESSES
P. W. Wright.
E. W. Collins

INVENTORS
William Rose
Henry Rose
BY
Howsan and Howsan
ATTORNEYS

No. 790,157. PATENTED MAY 16, 1905.
W. & H. ROSE.
MACHINE FOR MAKING COLLAPSIBLE BOXES.
APPLICATION FILED NOV. 8, 1902.
14 SHEETS—SHEET 8.
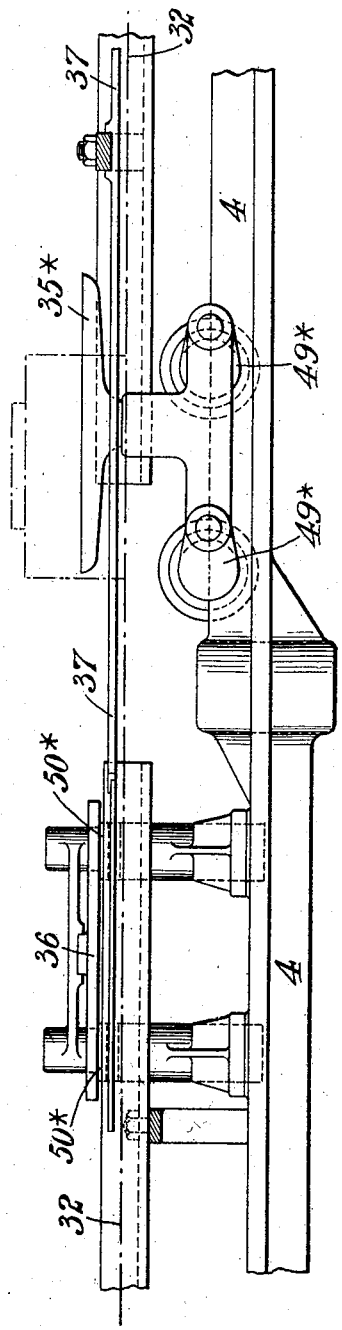

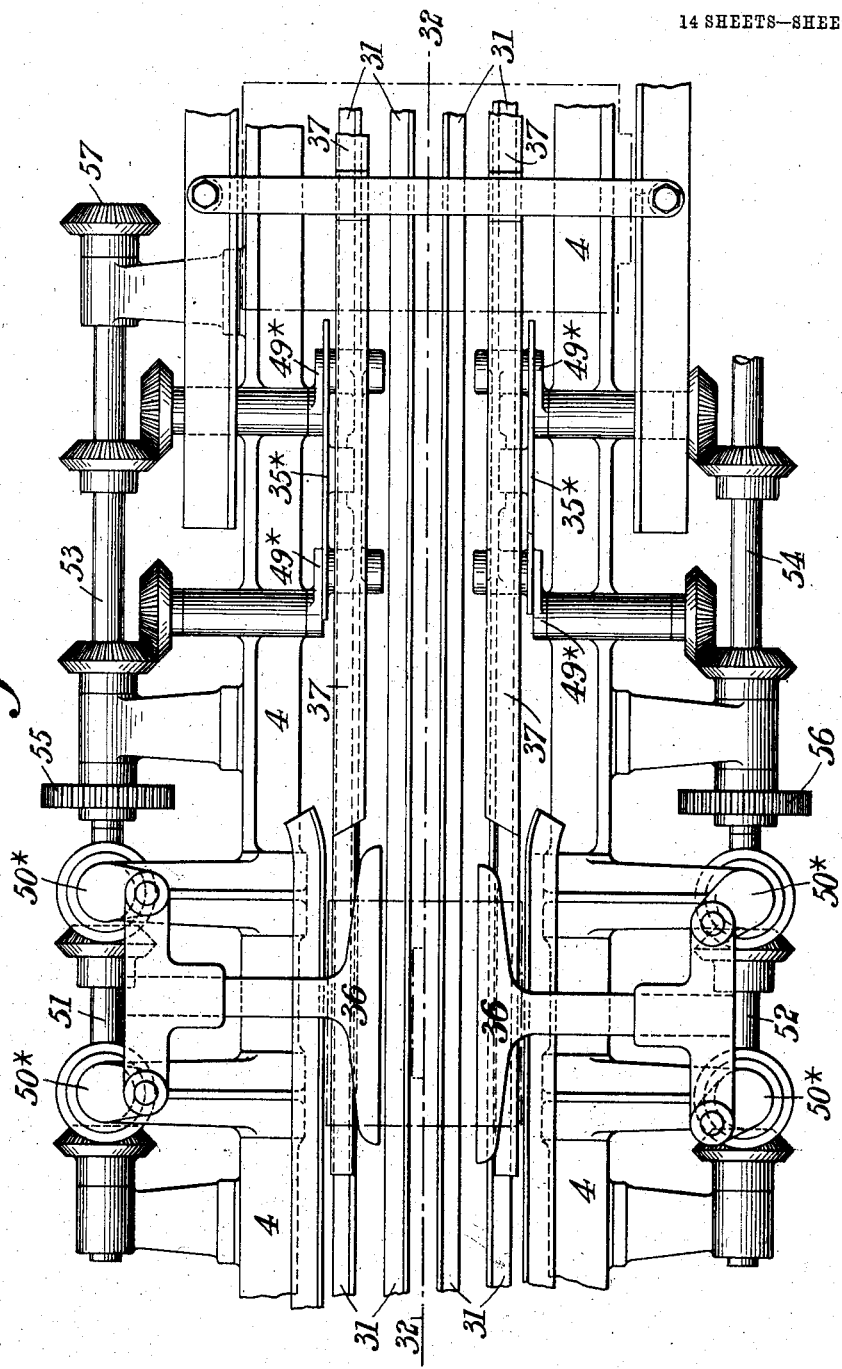

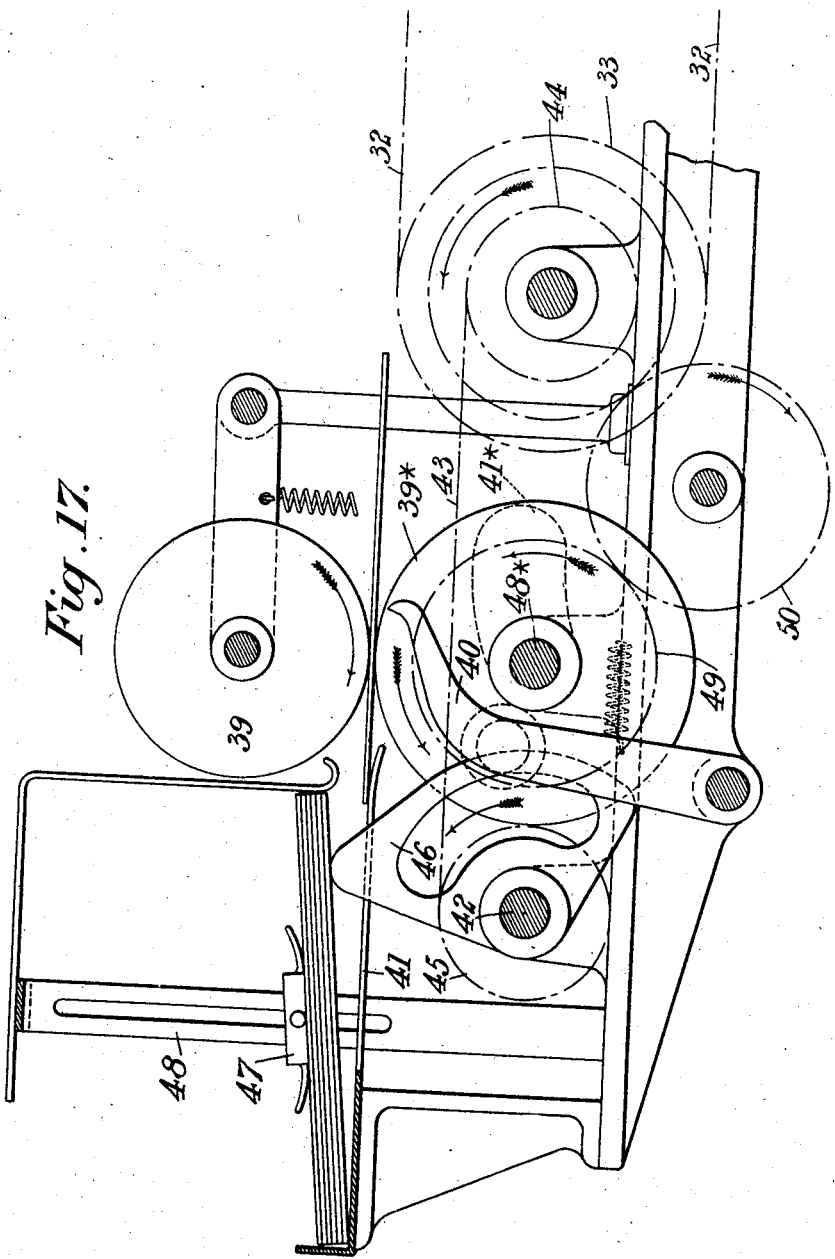

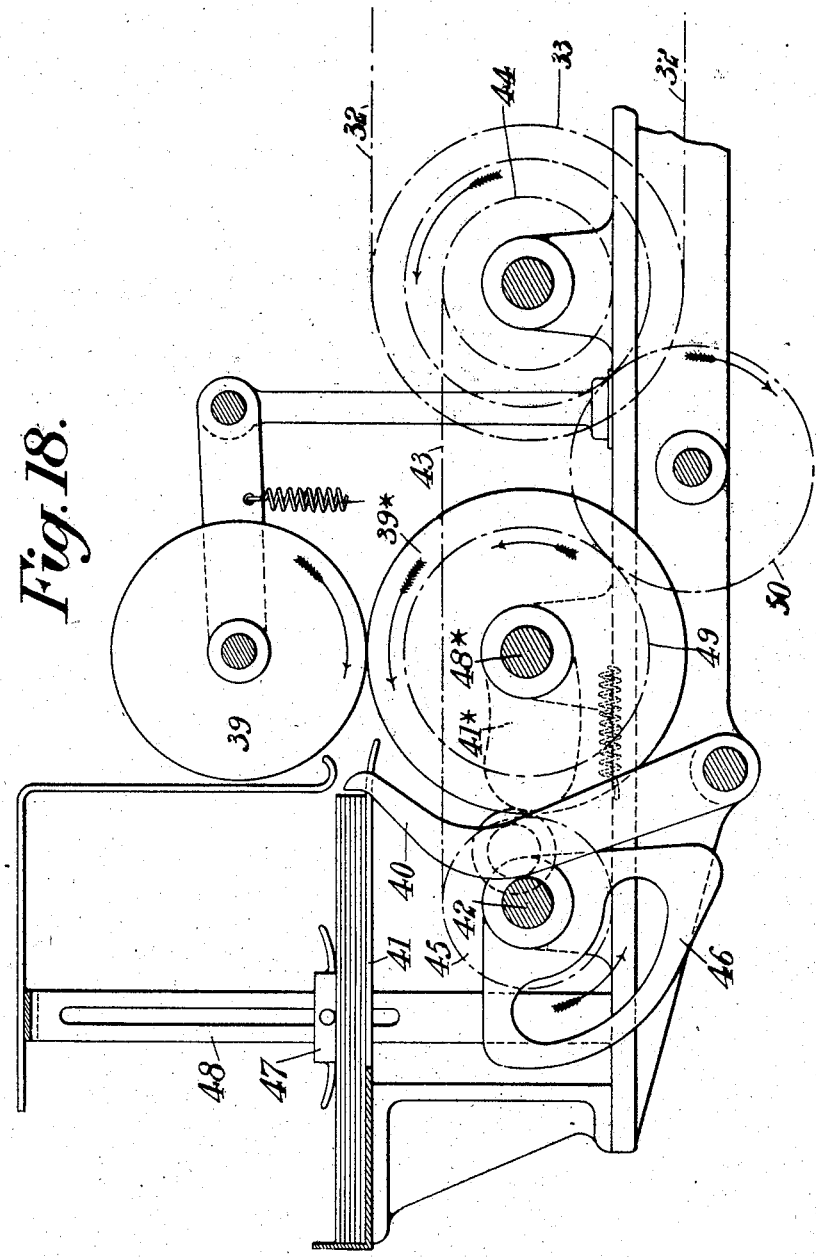

No. 790,157. PATENTED MAY 16, 1905.
W. & H. ROSE.
MACHINE FOR MAKING COLLAPSIBLE BOXES.
APPLICATION FILED NOV. 8, 1902.
14 SHEETS—SHEET 12.

WITNESSES
F.W. Wright
E. W. Collins

INVENTORS
William Rose
Henry Rose
BY
Howson and Howson
ATTORNEYS

No. 790,157.  
PATENTED MAY 16, 1905.  
W. & H. ROSE.  
MACHINE FOR MAKING COLLAPSIBLE BOXES.  
APPLICATION FILED NOV. 8, 1902.  
14 SHEETS—SHEET 14.

WITNESSES  
F. W. Wright.  
E. W. Collins.

INVENTORS  
William Rose  
Henry Rose  
BY  
Howson and Howson  
ATTORNEYS

No. 790,157.

Patented May 16, 1905.

UNITED STATES PATENT OFFICE.

WILLIAM ROSE AND HENRY ROSE, OF GAINSBOROUGH, ENGLAND.

MACHINE FOR MAKING COLLAPSIBLE BOXES.

SPECIFICATION forming part of Letters Patent No. 790,157, dated May 16, 1905.

Application filed November 8, 1902. Serial No. 130,510.

*To all whom it may concern:*

Be it known that we, WILLIAM ROSE and HENRY ROSE, of the firm of ROSE BROS., engineers, subjects of the King of Great Britain and Ireland, residing at Albion Works, Gainsborough, in the county of Lincoln, England, have invented certain new and useful Improvements in Machines for Making Collapsible Boxes, of which the following is a specification.

This invention relates to machines for making collapsible boxes, which boxes when collapsed occupy a minimum space and which when expanded into box form are neat in appearance, the angles or corners being sharp and the surfaces where the parts overlap smooth or level.

The blanks from which the boxes are made may be cut from a continuous web or roll of cardboard, thick paper, or the like, or each blank may be made from a separate sheet of cardboard, scale-board, thick paper, or the like fed into the machine by any suitable means. Each blank is in length equal to the combined widths of the several sides of the box to be formed plus a piece by which the two ends of the blank are to be connected together.

Figure 1:
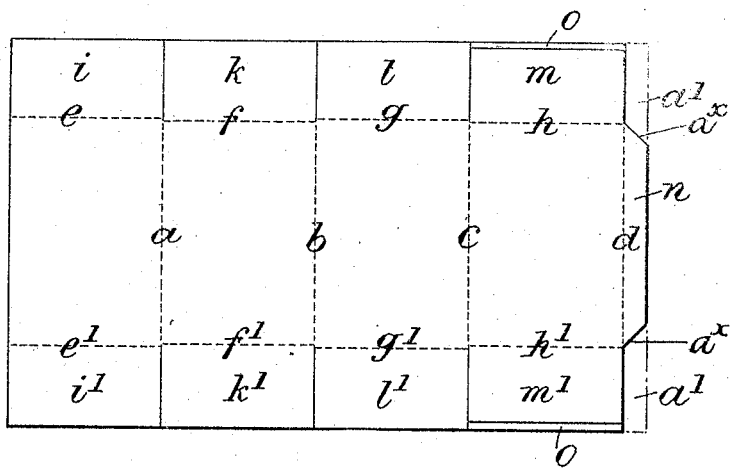
Figure 2:
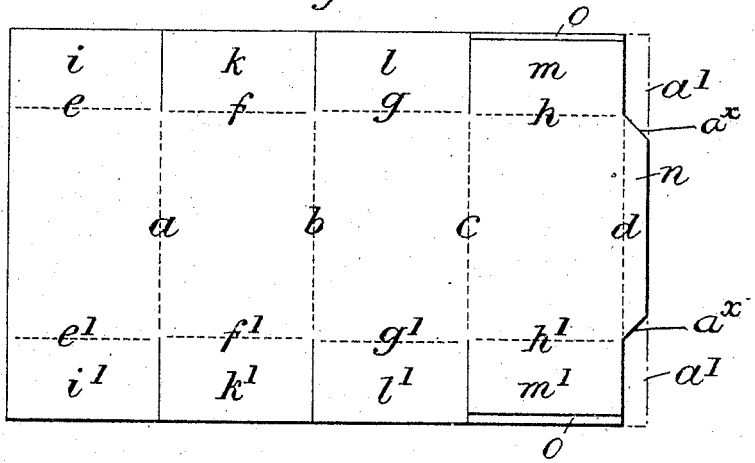
Figure 3:
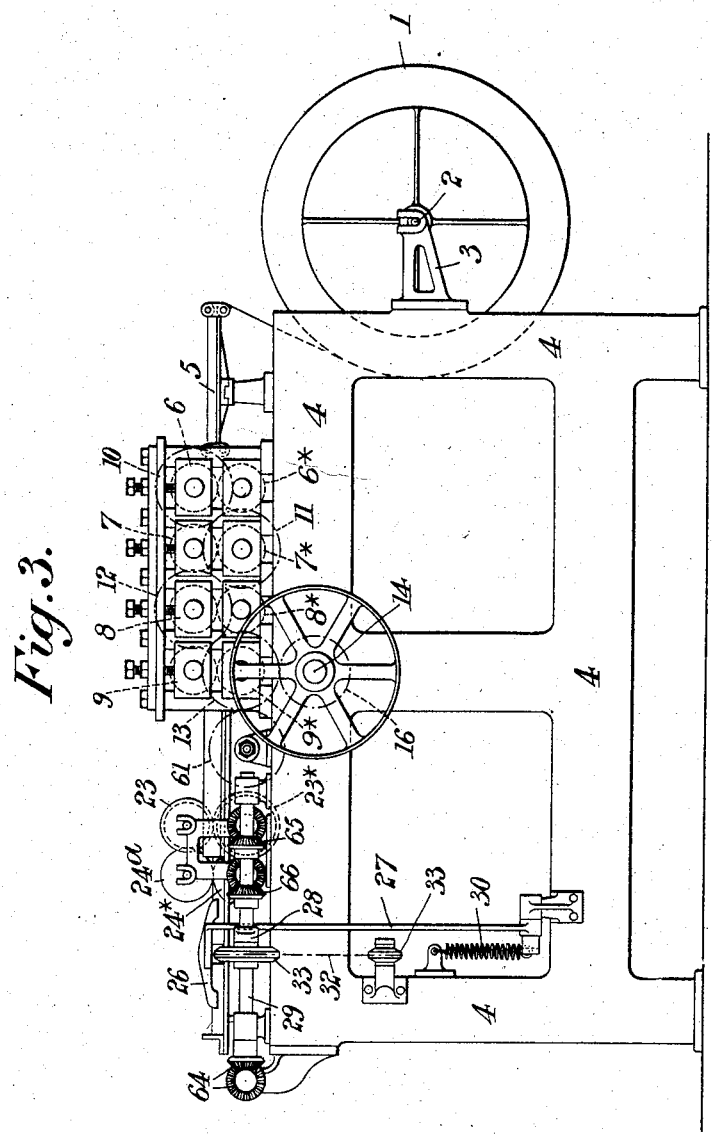
Figure 4:
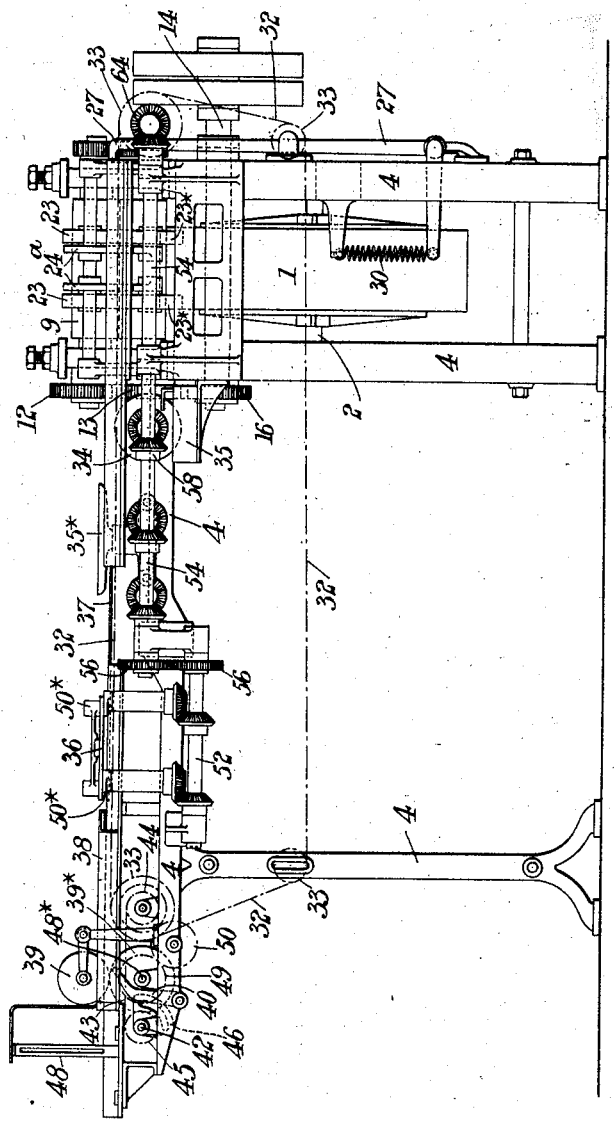
Figure 5:
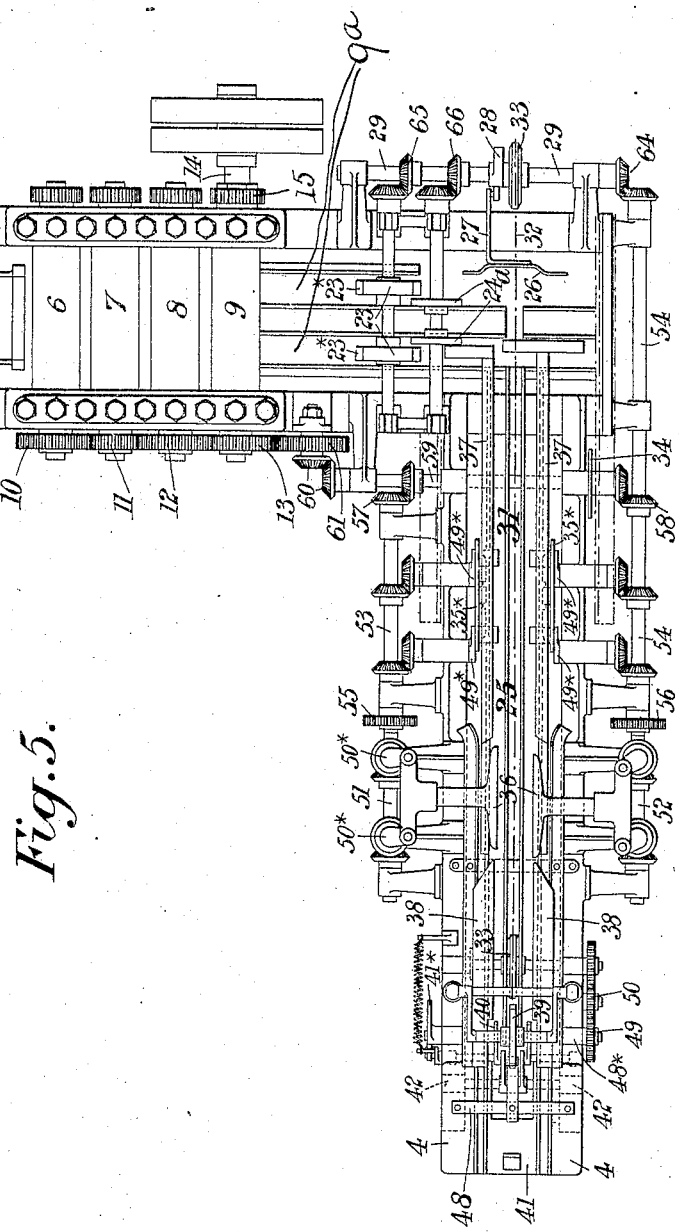
Figure 6:
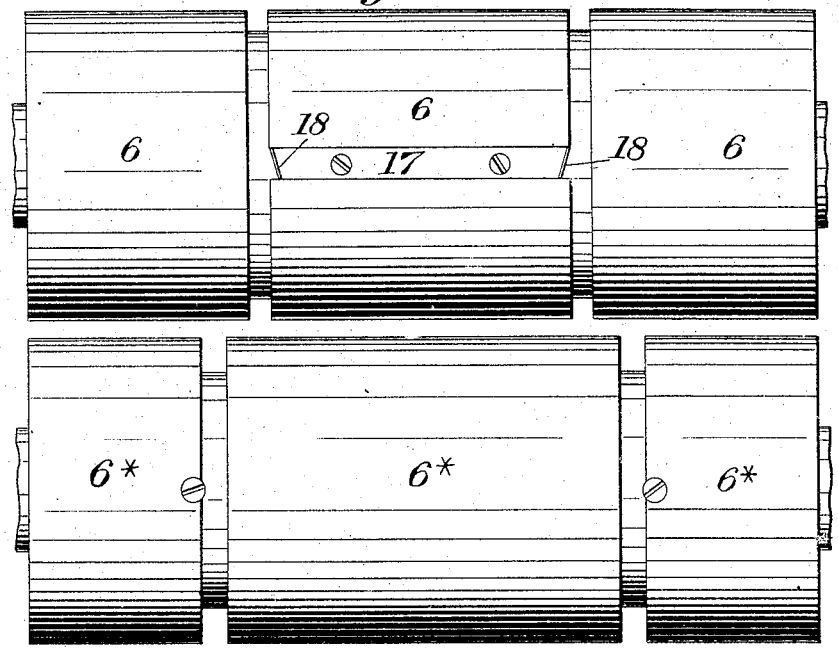
Figure 7:
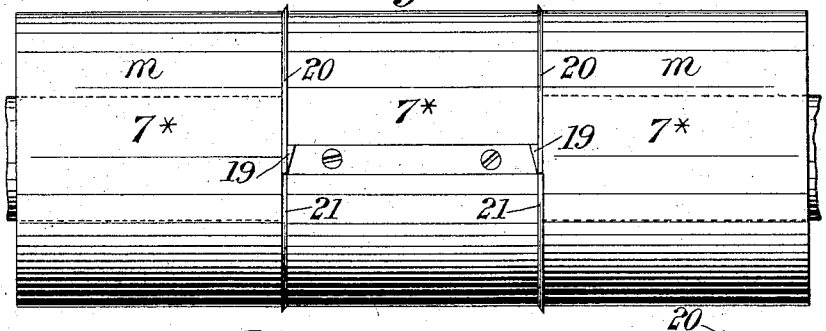
Figures 9, 10:
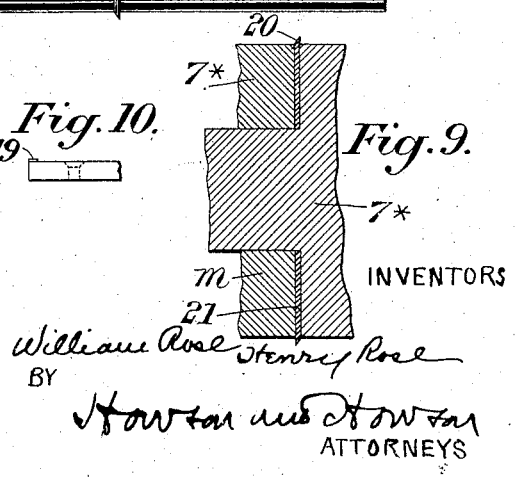
Figure 14:
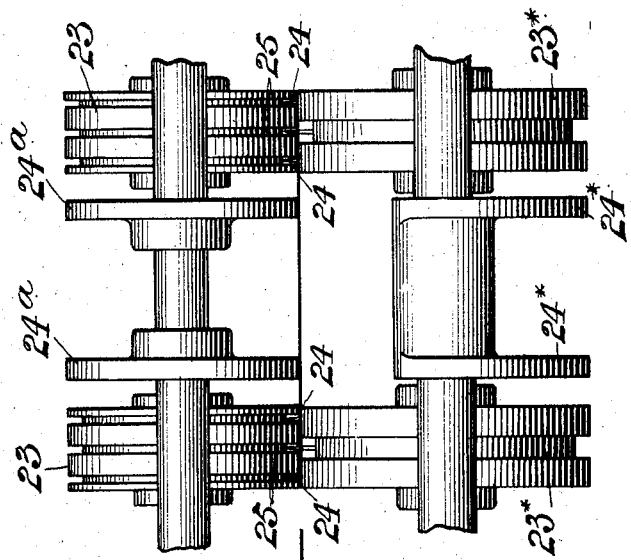
Figure 13:
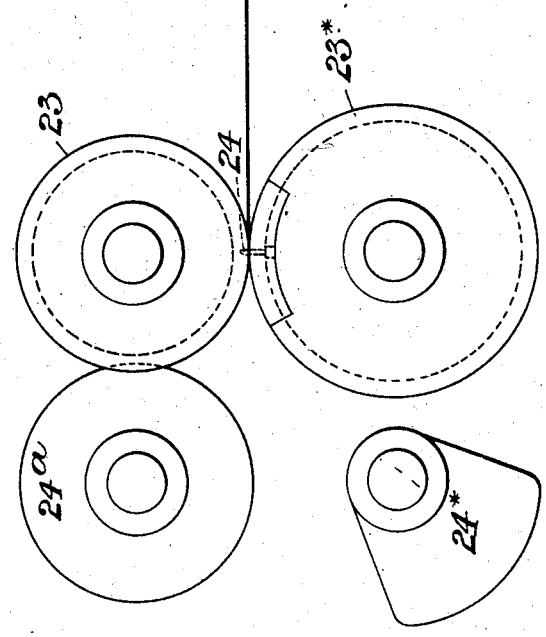
Figure 19:
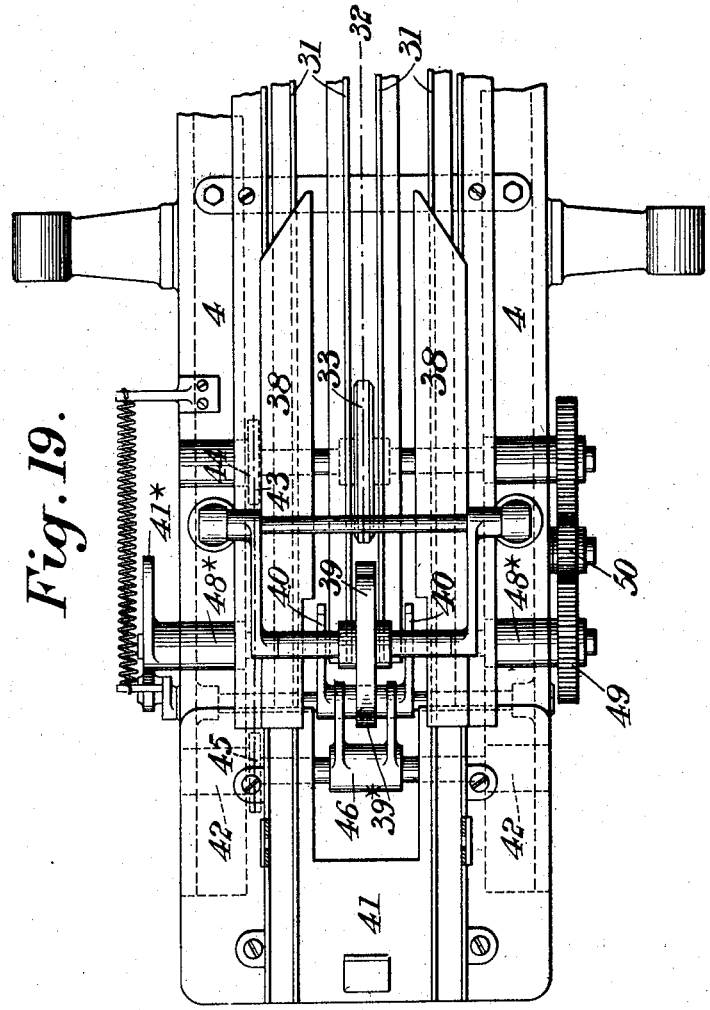
Figure 20:
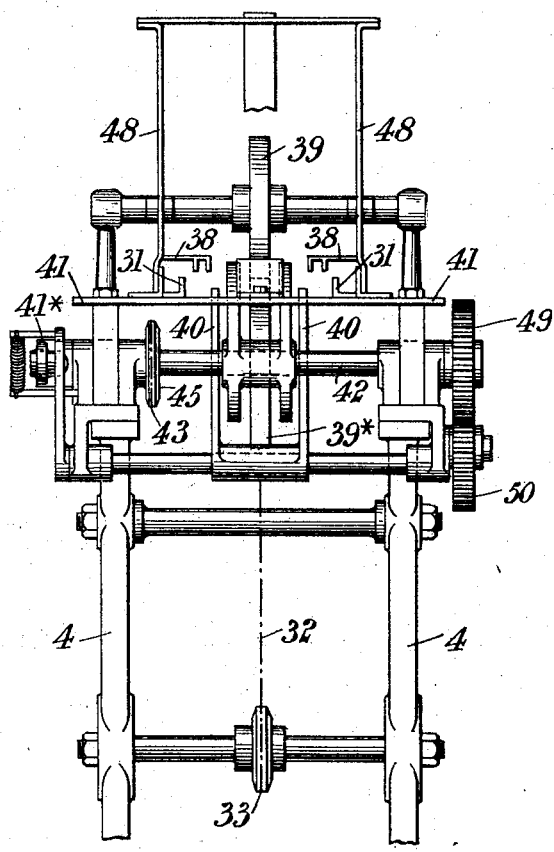
Figure 21:
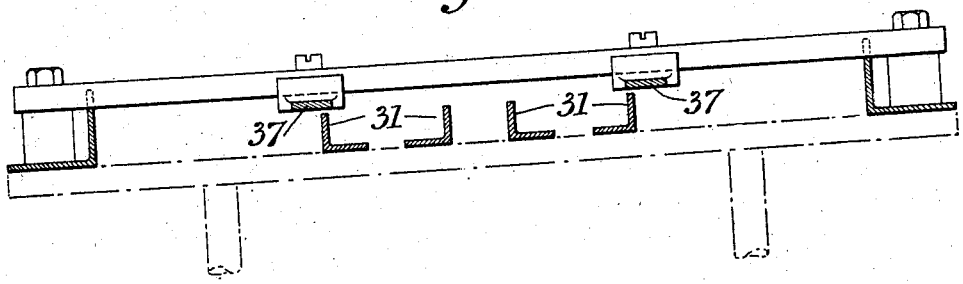
Figure 22:
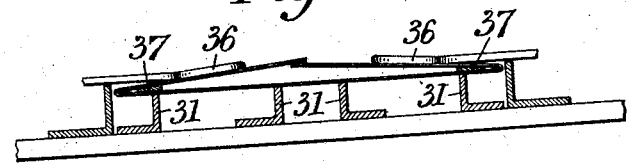
Figure 23:
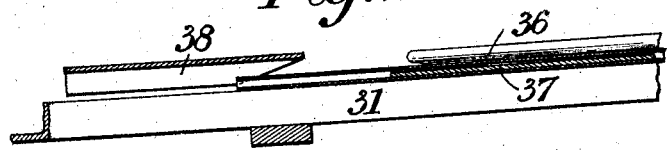

Figures 1 and 2 of the accompanying drawings are plans of blanks for collapsible boxes before being folded into box form. Figs. 3 and 4 are elevations at right angles to each other of a machine constructed according to our invention for making and folding the blanks and connecting together the two opposite ends of each blank, and Fig. 5 is a plan of Fig. 4. Fig. 6 is a front elevation of a pair of feeding-rollers hereinafter called the "first" pair of rollers. Fig. 7 is a front view, and Fig. 8 an end view, of the bottom roller of a second pair of rollers; and Fig. 9 is a longitudinal section of a portion of the said roller, showing the method of fixing the scoring-blades thereto; and Fig. 10 shows detached one of the cutting-blades carried on the said roller. Fig. 11 is a front elevation, and Fig. 12 a transverse section, of the fourth pair of rollers, showing the means for fixing the scoring-blades thereon. Figs. 13 and 14 are elevations at right angles to each other of the mechanism for separating the blanks from the length of card or the like and also for separating corner-pieces from one end of the blanks to form the connecting-piece on the blank end. Fig. 15 is a side elevation, and Fig. 16 a plan, of the mechanism by which the blanks are folded. Figs. 17 and 18 show in two different positions the portion of the machine for piling the folded blanks. Fig. 19 shows in plan, and Fig. 20 in end elevation, the mechanism for passing the folded blanks to the piling or stacking mechanism. Figs. 21, 22, and 23 are sectional views of the guiding and supporting bars for the blanks while being folded.

Referring to Figs. 1 and 2, it will be seen that each blank is scored or partly cut through in a direction at right angles to its length at $a\ b\ c\ d$, where the blank is to be bent or folded to form the sides of the box and where the piece by which the two ends are to be connected together is to be bent or folded. The blank is also scored in the longitudinal direction of the blank, as shown at $e\ e'$, $f\ f'$, $g\ g'$, $h\ h'$, these latter scorings being made in two places on each portion of the blank which is to form a side to the box. The scorings $e\ e'$, $g\ g'$ are made at equal distance from the two longitudinal edges of the blank, as are also the scorings $f\ f'$, $h\ h'$, those, $f\ f'$, $h\ h'$, made on the portions which are to form two opposite sides of the box being farther from the edges of the blank than are the scorings $e\ e'$, $g\ g'$ on the portions $l\ l'$, which are to form the other two opposite sides of the box. The distance between the two longitudinal lines of scoring determines the length of the box to be made, the parts marked $i\ i'$, $k\ k'$, $l\ l'$, $m\ m'$ being folded in to form the ends of the box.

In the following description of apparatus constructed according to our invention for making the blanks we will assume that the blanks are made from a continuous web or roll of material, which we will refer to as "cardboard," it being understood, however, that any other material capable of being scored and folded as hereinafter described may be employed.

A roll 1 of cardboard of the required width is carried on a spindle 2, mounted in bearings 3 on the frame 4 of the machine. The end of this roll of cardboard is conducted by a guide 5 between a pair of geared feeding-rollers 6 6$^\times$ (which we will hereinafter refer to as the "first" pair of rollers,) from between which pair of rollers the cardboard passes in succession between other pairs of geared rollers 7 7$^\times$, 8 8$^\times$, and 9 9$^\times$, by which the cardboard is cut and scored at the parts required. The several pairs of rollers 6 6$^\times$, 7 7$^\times$, 8 8$^\times$, and 9 9$^\times$ are geared together by wheels 10, 11, 12, and 13 and receive rotation from the main shaft 14 by gear-wheels 15 16.

The top roller 6 of the first pair of rollers carries a strip or bar of metal 17, as shown in the enlarged view, Fig. 6, having raised scoring-blades 18, which blades as the cardboard passes between the rollers 6 6$^\times$ penetrate or score the cardboard at the parts marked $a^\times$, Figs. 1 and 2.

Figure 8:
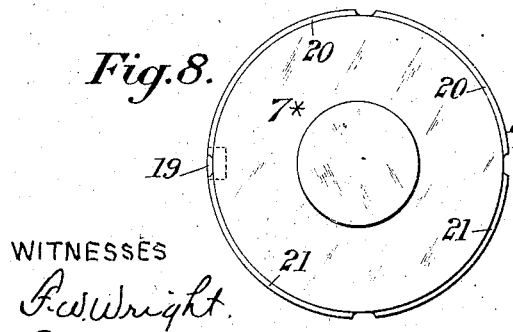

The top roller of the second pair of rollers 7 7$^\times$ is plain, while the bottom roller 7$^\times$, as shown in Figs. 7 and 8, carries a strip or bar having raised blades 19 corresponding to the blades 18 on the rollers 6. This roller 7$^\times$ also carries two pairs of semicircular scoring-knives 20 21, held in position by collars $m$, constituting part of the periphery of the roller. As the cardboard is passing between the rollers 7 7$^\times$ the blades 19 score or cut through the cardboard at the part where scored by the blades 18 from the other side of the cardboard, and the semicircular blades 20 and 21 score the blank at the parts shown in Fig. 1 at $e\ e'$, $g\ g'$ and $f\ f'$, $h\ h'$, respectively.

The top roller 8 of the third pair of rollers 8 8$^\times$ is plain, and the bottom roller 8$^\times$ has projecting longitudinal scoring-blades—such as shown at $p$, Figs. 11 and 12—which blades as the cardboard passes between these rollers 8 and 8$^\times$ make the transverse scores $a\ b\ c\ d$ from one edge to the opposite edge of the cardboard, the blades being so adjusted as to penetrate only partly through the cardboard. These blades are held in position on the roller by pieces $a'\ b'\ c'\ d'$ interposed between the blades and screwed to the body of the roller, as shown in Fig. 12. The object in causing the cutting-knives to penetrate but part way through the material is to secure a clean sharp cut for the edges of the blank thus produced which will be free from stray fibers and will not, as ordinarily is the case, show from which side the blank has been cut by the slight curve sometimes discernible at the edges of a blank.

The top roller 9 of the fourth pair of rollers 9 9$^\times$, as shown in Figs. 11 and 12, is provided with longitudinal scoring-blades $p$, similar to those carried on the roller 8$^\times$ and so arranged as to press on the cardboard as it passes between this pair of rollers exactly where the blades carried by the roller 8$^\times$ scored the opposite side of the cardboard, so that the cardboard will be cut clean through from the edge of the cardboard to the longitudinal scores, the parts between the longitudinal scores being left undivided by reason of the lower roller 9$^\times$ being flattened, as shown at 22, Figs. 11 and 12, at the parts where the parts of the cardboard to be kept undivided pass between these rollers. After leaving the fourth pair of rollers 9 9$^\times$ the end of the cardboard enters between rollers 23 23$^\times$. (Shown in detail in Figs. 13 and 14.) A pair of rails 9$^a$ serve to support the blank as it is fed from the rolls 9 9$^\times$. The rear edge of the blank is partially detached before the front end is gripped by the rolls 23 23$^\times$, which as they rotate faster than the rolls 9 9$^\times$ complete the detaching by pulling the blank away from the following blank. The top rollers 23 are grooved circumferentially, and the bottom rollers 23$^\times$ have projections or points 24, which as the cardboard is passing between the rollers enter the circumferential grooves 25 in the rollers 23 and engage those portions $a'$ of the blank shown by dotted lines in Fig. 1, so as to detach these parts. The rollers 23$^\times$ are larger in diameter and the peripheral speed thereof greater than the rollers 9 9$^\times$. Consequently the blank is detached from the main portion of the web of cardboard as it issues from between the roller 9 9$^\times$. The knives $p$ cut substantially through the pasteboard on the dotted line, Figs. 1 and 2, which is to form the advance edge of one blank and the rear edge of the next, and the other set of knives $p$ are interrupted in their cutting operation by the recess 22. Thus I prevent a severing on the mid-portion of the line $d$, so that, as before stated, the rollers 23 23$^\times$ may cause the completion of the separation on the outer line, while the projections of the wheels 24 24$^\times$ grasp the portions $a'$ and tear them free of the blank, which is then held by the rollers 23 23$^\times$. The blank passing from the rollers 23 23$^\times$ is nipped between rollers 24$^a$ and sectors 24$^\times$ and is thrown rapidly forward thereby into line with a track 25, arranged at right angles to the direction of traverse of the cardboard while being scored and cut. The blank is pushed square onto the track 25 by a bar 26, which is connected to a lever 27, operated by a cam 28 on a shaft 29, with which cam the lever 27 is kept in contact by a spring 30. The blanks are carried along the track 25 on runners or bars 31, Figs. 21, 22, 23, by an endless chain 32, carried on pulleys 33 and provided with projections at suitable distances apart to engage each blank in succession and carry the blanks forward with it. The portion $n$ of the blank (shown in Figs. 1 and 2) as the blank is carried along the track 25 comes into contact with a wheel or disk 34, which rotates in a vessel 35, containing adhesive material, whereby the portion $n$ of the blank receives a supply of adhesive material.

After passing over the wheel or disk 34 the two ends of the blank are bent upward along the score-lines $a$ and $c$ into a practically vertical position by folding devices $35^\times$ (shown clearly in Figs. 15 and 16) receiving vertical curvilinear movement. As the blank further advances the upstanding ends are folded one on top of the other by other folding devices, 36, which receive horizontal curvilinear movement, the said ends being folded over bars 37, which prevent the blank from being lifted off the track by the folders. The bars 37 are thinned at the outer edge to permit of the folded parts of the blank lying as close together as possible. One of the folders 36 acts on the end of the blank to which the adhesive material is applied a little in advance of the folder which acts on the other end of the blank, so that the folded parts may lie one over the other, as shown in Fig. 22. The blank thus folded is then carried forward by the endless chain 32 beneath stationary rods or bars 38, Fig. 19, which press the ends of the blank which overlap into close contact. The folded blank passes thence between a pair of rollers 39 $39^\times$, Figs. 17 and 18, by which the overlapping ends of the blank are pressed and securely connected together by the adhesive material.

The folded blanks, as they pass from between the rollers 39 $39^\times$, are engaged by fingers 40, which force the blanks onto a tray or frame 41. (Shown in Figs. 17 and 18.) The fingers 40 are operated at the required periods by a cam or tappet $41^\times$ on the shaft of the roller $39^\times$. As shown in Figs. 17 and 18, a shaft 42 receives rotary motion by means of a chain 43 and chain-wheels 44 45 from the shaft of one of the pulleys 33, round which the chain 32 passes. On the shaft 42 is a cam 46, which at each rotation of the said shaft lifts the blanks which are on the frame or tray 41, as shown in Fig. 17, and at the same time the fingers 40 are caused to push a folded blank as it leaves the rollers 39 $39^\times$ beneath those in the tray 41, as shown in Fig. 18. The blanks in the frame or tray 41 are pressed down by a weight 47, sliding in vertical guides 48. The shaft $48^\times$, on which the roller $39^\times$ and the cam or tappet $40^\times$ are mounted, is rotated by gear-wheels 49 and 50 from the axle of the pulley or chain wheel 33. The folding devices $35^\times$ and 36 receive their curvilinear movements from cranks $49^\times$ $50^\times$, rotated by gearing from the horizontal shafts 51 52 53 54. The shafts 51 52 are rotated, respectively, by spur-wheels 55 and 56 from the horizontal shafts 53 54, which in turn receive motion by bevel-gearing 57 58 from a transverse shaft 59, which carries the wheel or disk 34 and is rotated by the bevel-wheels 60, driven by gear-wheels 61 from the main driving-shaft 14. The chain-wheel shaft 29 is rotated by gearing 64 from the horizontal shaft 54. The shaft 29 carries the driving-chain wheel 33, the cam 28, and also the bevel-wheels 65 66, which rotate the rollers $23^\times$ and sectors $24^\times$. The several cams and gearing are suitably timed to effect the operations hereinbefore described in their required sequential order.

In order not to weaken the boxes at the corners, the longitudinal scorings $e\ e'$, $f\ f'$, $g\ g'$, $h\ h'$ may be discontinued at a short distance from the transverse scorings $a\ b\ c\ d$ and the said transverse scorings be also discontinued at a short distance from the longitudinal scorings, as shown in Fig. 2, so as to leave unscored the parts of the blanks which form the corners of the boxes. For this purpose shorter scoring-blades are provided on the scoring-rollers, or the said blades have portions cut away at those parts which would otherwise score the blanks at those parts which form the corners of the boxes.

We claim as our invention—

1. A machine for the manufacture of paper boxes, comprising means for feeding material, rollers in sets of two, one roller of one set having short knives to cut part through the material in the direction of its length, a roller of another set also having knives of substantially the same outline as the first, but adapted to cut from the opposite side.

2. A machine for the manufacture of paper boxes, comprising means for feeding material, rollers in sets of two, one roller of one set having short knives to cut part through the material in the direction of its length, a roller of another set also having knives of substantially the same outline as the first, but adapted to cut from the opposite side, circular scoring-knives, longitudinal cutting and scoring knives on a roller of still another set and adapted to penetrate part way into the material, a longitudinal knife on a roller of still another set adapted to cut from the opposite side, and a recessed portion on the underneath roller of said pair to prevent cutting at such portion.

3. A machine for making paper boxes, having cutting rollers for severing portions $a^\times$ from the end of the blanks, and means for feeding the blanks away from said roller, in combination with rollers with projections in the path of the feed of the blank adapted to disengage such portions $a^\times$ from the blank.

4. A machine for making paper boxes, having cutting-rollers for severing portions $a^\times$ from the end of the blanks, and means for feeding the blanks away from said rollers, in combination with rollers with projections in the path of the feed of the blank, and means for rotating said rollers with projections at a greater circumferential speed than the speed of the blank, whereby the projections are caused to take hold of the said portions $a^\times$ and detach them from the blank.

5. In combination with the cutting-rolls of a paper-box machine, a pair of grooved rollers, projections on one entering the grooves of the other, means for feeding the blanks thereto to cause the projections to engage certain predetermined cut portions $a^\times$ to detach them from the blank.

6. A paper-box machine, comprising cutting-rollers, feed-rollers of greater circumferential speed than the cutting-rollers and adapted to advance a blank therefrom, a track at right angles to the path of said advance, in combination with a reciprocating pusher adapted to project a blank from its first path of travel along the said track, and a cam to withdraw it in advance of the feed of the next blank.

7. In a machine for the manufacture of paper boxes, cutting-rollers and feed-rollers, a track at right angles to the path of travel of the blanks from the feed-rollers, and a reciprocating pusher adapted to project a blank as it comes from the feed-rollers onto the aforesaid track, in combination with means for advancing the blank first in advance of the feed-rollers faster than the following blank, whereby the pusher after projecting a blank may be withdrawn before the arrival of said following blank into position before it.

8. A machine for the manufacture of paper boxes, having cutting-rollers, in combination with a track and means for feeding scored blanks along said track, bars above the track, and a pair of folders having vertical curvilinear reciprocating motion and adapted to upset the ends of said blanks, and a second set of folders having horizontal curvilinear reciprocating motion and adapted to then bend down the said upset ends, said folders being mounted along said track and means to actuate the folders.

In testimony whereof we affix our signatures in presence of two subscribing witnesses.

WILLIAM ROSE.
HENRY ROSE.

Witnesses:
ROBERT ABNER JONES,
JEFFREY GEORGE ELY.